United States Patent
Son et al.

(10) Patent No.: US 8,730,478 B2
(45) Date of Patent: May 20, 2014

(54) MANUFACTURING AND TESTING TECHNIQUES FOR ELECTRONIC DISPLAYS

(71) Applicant: Apple Inc., Cupertino, CA (US)

(72) Inventors: Moo Kyung Son, Sunnyvale, CA (US);
Victor Hao-En Yin, Cupertino, CA (US); John Z. Zhong, Saratoga, CA (US); Wei Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/866,413

(22) Filed: Apr. 19, 2013

(65) Prior Publication Data

US 2013/0229594 A1    Sep. 5, 2013

Related U.S. Application Data

(62) Division of application No. 12/835,431, filed on Jul. 13, 2010, now Pat. No. 8,441,643.

(51) Int. Cl.
*G01N 21/00* (2006.01)

(52) U.S. Cl.
USPC ............................................. 356/432

(58) Field of Classification Search
USPC ............................................. 356/432
See application file for complete search history.

(56) References Cited

U.S. PATENT DOCUMENTS

| | | |
|---|---|---|
| 5,529,630 A | 6/1996 | Imahashi et al. |
| 6,426,791 B2 | 7/2002 | Imao et al. |
| 6,975,386 B2 | 12/2005 | Tsumura et al. |
| 2007/0040796 A1* | 2/2007 | Lee ............................... 345/102 |
| 2009/0115714 A1* | 5/2009 | Jeong et al. ..................... 345/88 |
| 2009/0291511 A1 | 11/2009 | Umezu et al. |
| 2009/0298208 A1 | 12/2009 | Amago et al. |
| 2011/0051064 A1* | 3/2011 | Matsumori et al. ........... 349/123 |

* cited by examiner

*Primary Examiner* — Roy M Punnoose

(57) ABSTRACT

A method for testing photosensitivity of an electronic display module, such as a liquid crystal display module, is provided. In one embodiment, a method includes exposing a display module to light at a first intensity and measuring an amount of light transmitted through the display module. The method may also include exposing the display module to light at a second intensity and measuring an amount of that light transmitted through the display module. The measured amounts may then be compared to determine an optical property, such as photosensitivity, of the display panel. Various other methods, systems, and manufactures are also disclosed.

20 Claims, 10 Drawing Sheets

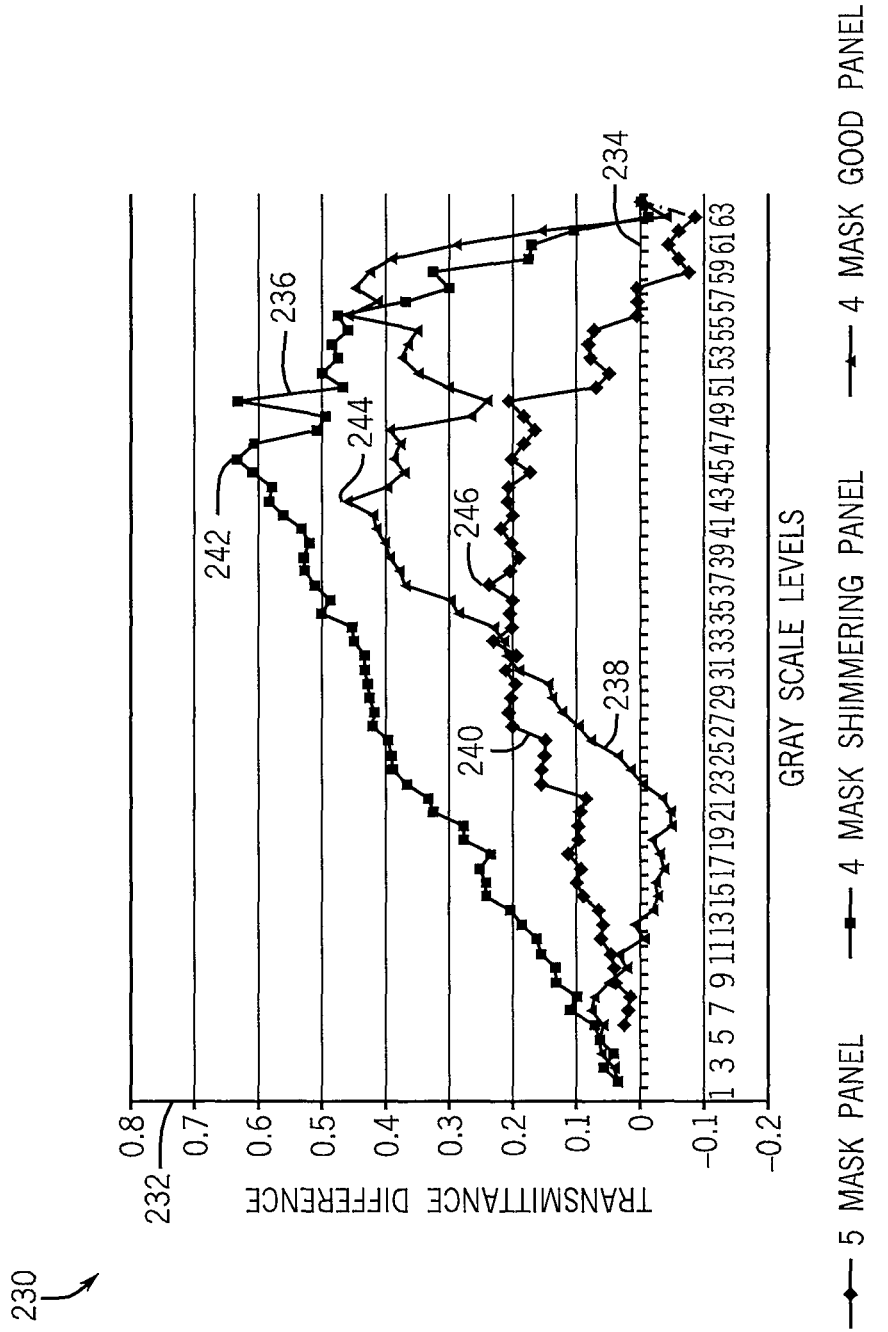

MANUFACTURING AND TESTING TECHNIQUES FOR ELECTRONIC DISPLAYS

This application is a division of patent application Ser. No. 12/835,431, filed Jul. 13, 2010, which is hereby incorporated by reference herein in its entirety. This application claims the benefit of and claims priority to patent application Ser. No. 12/835,431, filed Jul. 13, 2010.

BACKGROUND

1. Technological Field

This disclosure relates generally to electronic displays, such as liquid crystal displays. More specifically, the present disclosure relates to the manufacture and testing of such electronic displays.

2. Description of the Related Art

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery-powered devices or in other contexts where it is desirable to minimize power usage.

LCDs typically include an LCD panel having, among other things, a liquid crystal layer disposed between opposing transparent substrates. The amount of light allowed to pass through the LCD panel varies based on the relative orientation of the liquid crystals. One or both substrates may include electrodes to create electric fields that control the orientation of the liquid crystals and, consequently, the amount of light transmitted by the LCD panel.

Additional circuitry may also be provided in the LCD panel to facilitate control of the liquid crystals. For example, thin-film transistors (TFTs) and various conductive lines may be formed on an LCD panel substrate along with electrodes during manufacturing. Circuitry of the LCD panel may be formed through a series of semiconductor fabrication processes that form and remove materials from a substrate. As this circuitry controls the orientation of the liquid crystals in the LCD panel, these fabrication processes impact the optical properties of the resulting LCD panel.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to the manufacture of panels of electronic displays and the testing of optical properties of such panels. In one embodiment, the photosensitivity of a display panel is detected by measuring transmittance of pixels of the panel at different pixel voltage levels and at different light source (e.g., a backlight) luminance conditions. For example, gamma data or curves—representative of transmittance levels of pixels at different pixel voltage levels—may be measured for multiple luminance conditions, such as a first "dim" condition and a second "bright" condition. The gamma data may then be compared to determine transmittance differences for the pixels resulting from the different lighting conditions. Such measurements and determinations may be made before assembly of panels with other components of an electronic display (e.g., backlights and housings), and may facilitate a feedback loop for the panel manufacturing process. In other instances, the present techniques may be used to test assembled electronic displays, rather than just the display panel itself.

Various refinements of the features noted above may exist in relation to the presently disclosed embodiments. Additional features may also be incorporated in these various embodiments as well. These refinements and additional features may exist individually or in any combination. For instance, various features discussed below in relation to one or more of the illustrated embodiments may be incorporated into any of the above-described embodiments alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Advantages of the present disclosure may become apparent upon reading the following detailed description and upon reference to the drawings in which:

FIG. 14 is a graph depicting examples of transmittance differences of several LCD panels at multiple gray scale levels in accordance with aspects of the present disclosure.

DETAILED DESCRIPTION OF SPECIFIC EMBODIMENTS

Figure 1:
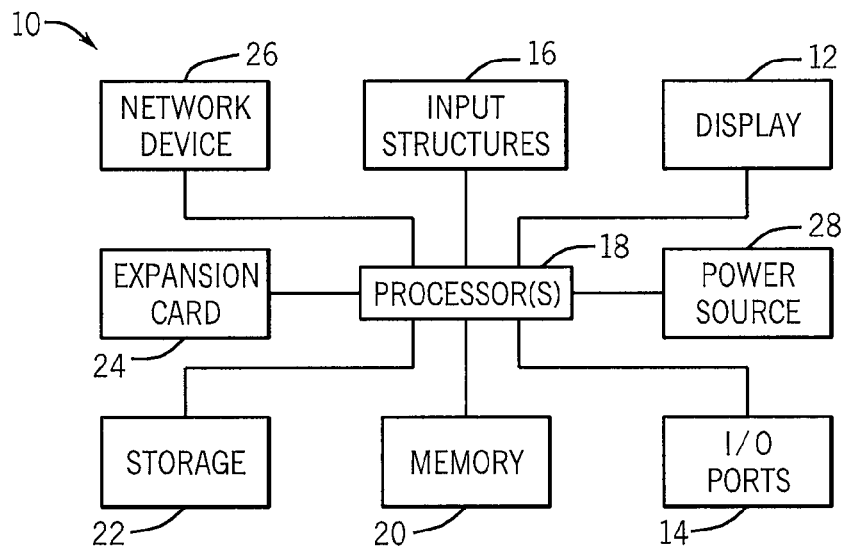
FIG. 1 is a block diagram of exemplary components of an electronic device, in accordance with aspects of the present disclosure.

One or more specific embodiments will be described below. These described embodiments are provided only by way of example, and do not limit the scope of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

As noted above, the present application is generally directed to the manufacturing and testing of optical properties of an electronic display, such as the photosensitivity of such displays resulting from the incorporation of photosensitive materials in the displays. For instance, a TFT-LCD display may include photosensitive active materials, such as amorphous silicon (a-Si), whose conductivity (and mobility) changes in response to light. In some displays, the photosensitive active materials may be used as active channels in TFTs of the displays. Even if these active channels in the TFTs are not directly exposed to light from a backlight unit in operation (e.g., gate material may shield the active channels), these active channels may be indirectly exposed and impacted by light. Additionally, in some LCD manufacturing process, photosensitive active materials may also be disposed beneath data lines formed on a substrate of the display panel. The extent to which the electrical properties of the active materials are impacted depend on the amount of light to which they are exposed and, consequently, on the design and construction of the TFT layer and the fabrication process tolerances.

With respect to LCD manufacturing processes, it is noted that the number of processing steps used in a particular manufacturing process impacts the ultimate manufacturing costs for producing LCDs. Such processing steps often include forming and patterning layers of material on substrates of display panels. Patterning of the materials is often accomplished via lithographic techniques that employ resist layers, photo masks, and etchants, applied at and for various times, to form desired structures on the display panels. Typically, reducing the number of steps results in increased production rates and reduced costs.

Accordingly, a four-mask manufacturing process (i.e., one that uses four masks in the patterning of the structures of the TFT layer) may be less expensive than a five-mask manufacturing process. In a five-mask process, the active layer of the TFT layer may be formed and patterned using a mask, and various conductive lines (e.g., data lines) and portions of the TFTs (e.g., sources and drains) may then be formed and patterned using a different mask. In contrast, a four-mask process may use a single mask for patterning both the active layer and the above-noted conductive portions (e.g., the data lines, sources, and drains), in which the conductive portions are disposed over the active layer. While this combination may reduce the manufacturing costs associated with displays, it may also increase the photosensitivity of the displays by increasing the amount of the active material (e.g., by including active material underneath the data lines) exposed to light during operation of the display.

In some instances, the photosensitivity of the a-Si or other active materials may result in visual artifacts in images output by the display. For example, in a display having a pulse-width modulated (PWM) backlight, optical beating between the horizontal-line frequency of a display (e.g., 40 kHz-60 kHz) and the PWM dimming frequency of the backlight (e.g., 400 Hz-600 Hz) may cause a user to perceive a "shimmering" effect in the displayed images. Further, as the brightness capabilities of LCD backlights increase, the visual artifacts resulting from the photosensitivity may also become more pronounced.

To reduce the perception of such visual artifacts, the PWM dimming frequency may be increased beyond the visual perception range of the human eye, such as to a level of about 20 kHz to about 60 kHz. This approach, however, may reduce the power efficiency of the backlight (e.g., of LED drivers) due to the increased PWM switching frequency, may generate acoustic noise, and may lead to other technical challenges.

Accordingly, the presently disclosed techniques facilitate measurement and improvement of the intrinsic photosensitivity of electronic displays to reduce visual artifacts in displayed images. As discussed in greater detail below, in one embodiment the transmittance of a display panel may be measured at different magnitudes of light exposure, and the measured transmittances may be compared to one another to determine the photosensitivity of the display panel. Additionally, if the photosensitivity exceeds a desired threshold, manufacturing process changes may be implemented to improve the photosensitivity of the resulting displays. The present techniques may enable better design flexibility and performance, while lowering manufacturing costs. With these foregoing features in mind, a general description of electronic devices including a display that may be manufactured, tested, or both, in accordance with the presently disclosed techniques is provided below.

As may be appreciated, electronic devices may include various internal and/or external components which contribute to the function of the device. For instance, FIG. 1 is a block diagram illustrating components that may be present in one such electronic device 10. Those of ordinary skill in the art will appreciate that the various functional blocks shown in FIG. 1 may include hardware elements (including circuitry), software elements (including computer code stored on a computer-readable medium, such as a hard drive or system memory), or a combination of both hardware and software elements. FIG. 1 is only one example of a particular implementation and is merely intended to illustrate the types of components that may be present in the electronic device 10. For example, in the presently illustrated embodiment, these components may include a display 12, input/output (I/O) ports 14, input structures 16, one or more processors 18, one or more memory devices 20, non-volatile storage 22, expansion card(s) 24, networking device 26, and power source 28.

The display 12 may be used to display various images generated by the electronic device 10. The display 12 may be any suitable display, such as a liquid crystal display (LCD) or an organic light-emitting diode (OLED) display. Additionally, in certain embodiments of the electronic device 10, the display 12 may be provided in conjunction with a touch-sensitive element, such as a touchscreen, that may be used as part of the control interface for the device 10.

The I/O ports 14 may include ports configured to connect to a variety of external devices, such as a power source, headset or headphones, or other electronic devices (such as handheld devices and/or computers, printers, projectors, external displays, modems, docking stations, and so forth). The I/O ports 14 may support any interface type, such as a universal serial bus (USE) port, a video port, a serial connection port, an IEEE-1394 port, an Ethernet or modem port, and/or an AC/DC power connection port.

The input structures 16 may include the various devices, circuitry, and pathways by which user input or feedback is provided to processor(s) 18. Such input structures 16 may be configured to control a function of an electronic device 10, applications running on the device 10, and/or any interfaces or devices connected to or used by device 10. For example, input structures 16 may allow a user to navigate a displayed user interface or application interface. Non-limiting examples of input structures 16 include buttons, sliders, switches, control pads, keys, knobs, scroll wheels, keyboards, mice, touchpads, and so forth. Additionally, in certain embodiments, one or more input structures 16 may be provided together with display 12, such an in the case of a touchscreen, in which a touch sensitive mechanism is provided in conjunction with display 12.

Processors 18 may provide the processing capability to execute the operating system, programs, user and application interfaces, and any other functions of the electronic device 10. The processors 18 may include one or more microprocessors, such as one or more "general-purpose" microprocessors, one or more special-purpose microprocessors or ASICS, or some combination of such processing components. For example, the processors 18 may include one or more reduced instruction set (RISC) processors, as well as graphics processors, video processors, audio processors, and the like. As will be appreciated, the processors 18 may be communicatively coupled to one or more data buses or chipsets for transferring data and instructions between various components of the electronic device 10.

Programs or instructions executed by processor(s) 18 may be stored in any suitable manufacture that includes one or more tangible, computer-readable media at least collectively storing the executed instructions or routines, such as, but not limited to, the memory devices and storage devices described below. Also, these programs (e.g., an operating system) encoded on such a computer program product may also include instructions that may be executed by the processors 18 to enable device 10 to provide various functionalities, including those described herein.

The instructions or data to be processed by the one or more processors 18 may be stored in a computer-readable medium, such as a memory 20. The memory 20 may include a volatile memory, such as random access memory (RAM), and/or a non-volatile memory, such as read-only memory (ROM). The memory 20 may store a variety of information and may be used for various purposes. For example, the memory 20 may store firmware for electronic device 10 (such as basic input/output system (BIOS)), an operating system, and various other programs, applications, or routines that may be executed on electronic device 10. In addition, the memory 20 may be used for buffering or caching during operation of the electronic device 10.

The components of the device 10 may further include other forms of computer-readable media, such as non-volatile storage 22 for persistent storage of data and/or instructions. Non-volatile storage 22 may include, for example, flash memory, a hard drive, or any other optical, magnetic, or solid-state storage media. Non-volatile storage 22 may be used to store firmware, data files, software programs, wireless connection information, and any other suitable data.

The embodiment illustrated in FIG. 1 may also include one or more card or expansion slots. The card slots may be configured to receive one or more expansion cards 24 that may be used to add functionality, such as additional memory, I/O functionality, or networking capability, to electronic device 10. Such expansion cards 24 may connect to device 10 through any type of suitable connector, and may be accessed internally or external to the housing of electronic device 10. For example, in one embodiment, expansion cards 24 may include a flash memory card, such as a SecureDigital (SD) card, mini- or microSD, CompactFlash card, Multimedia card (MMC), or the like. Additionally, expansion cards 24 may include one or more processor(s) 18 of the device 10, such as a video graphics card having a GPU for facilitating graphical rendering by device 10.

The components depicted in FIG. 1 also include a network device 26, such as a network controller or a network interface card (NIC). In one embodiment, the network device 26 may be a wireless NIC providing wireless connectivity over any 802.11 standard or any other suitable wireless networking standard. The device 10 may also include a power source 28. In one embodiment, the power source 28 may include one or more batteries, such as a lithium-ion polymer battery or other type of suitable battery. Additionally, the power source 28 may include AC power, such as provided by an electrical outlet, and electronic device 10 may be connected to the power source 28 via a power adapter. This power adapter may also be used to recharge one or more batteries of device 10.

Figure 2:
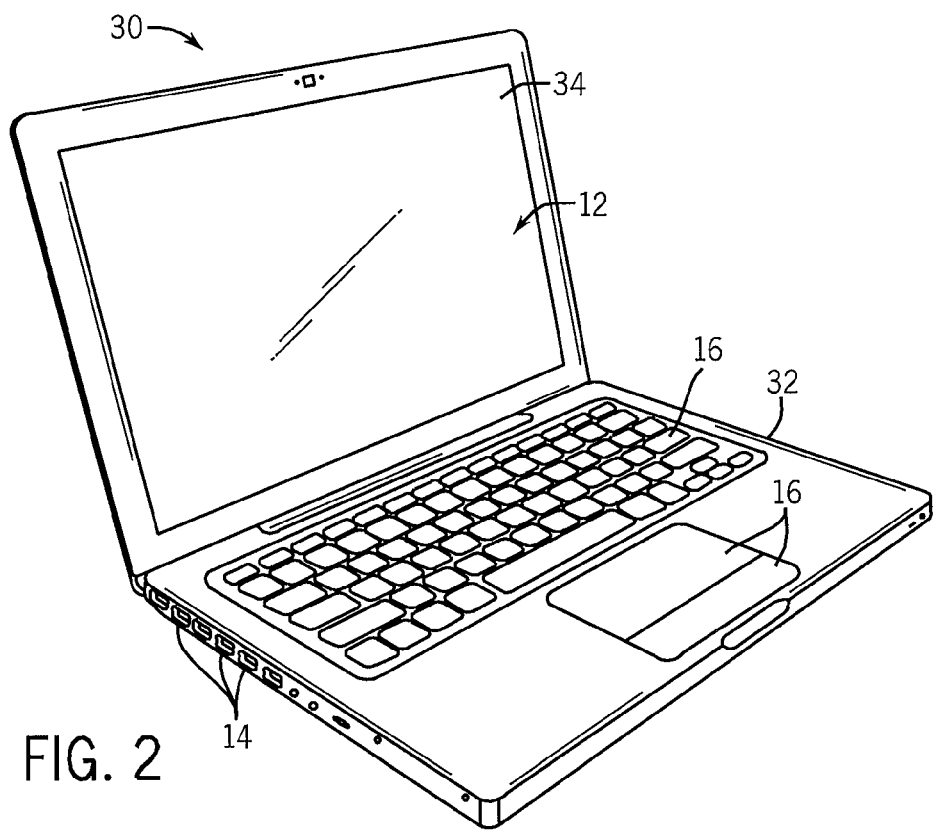
FIG. 2 is a perspective view of a computer in accordance with aspects of the present disclosure.

The electronic device 10 may take the form of a computer system or some other type of electronic device. Such computers may include computers that are generally portable (such as laptop, notebook, tablet, and handheld computers), as well as computers that are generally used in one place (such as conventional desktop computers, workstations and/or servers). In certain embodiments, electronic device 10 in the form of a computer may include a model of a MacBook®, MacBook® Pro, MacBook Air®, iMac®, Mac® mini, or Mac Pro® available from Apple Inc. of Cupertino, Calif. By way of example, an electronic device 10 in the form of a laptop computer 30 is illustrated in FIG. 2 in accordance with one embodiment. The depicted computer 30 includes a housing 32, a display 12 (e.g., in the form of an LCD 34 or some other suitable display), I/O ports 14, and input structures 16.

The display 12 may be integrated with the computer 30 (e.g., such as the display of the depicted laptop computer) or may be a standalone display that interfaces with the computer 30 using one of the I/O ports 14, such as via a DisplayPort, Digital Visual Interface (DVI), High-Definition Multimedia Interface (HDMI), or analog (D-sub) interface. For instance, in certain embodiments, such a standalone display 12 may be a model of an Apple Cinema Display®, available from Apple Inc.

Figure 3:
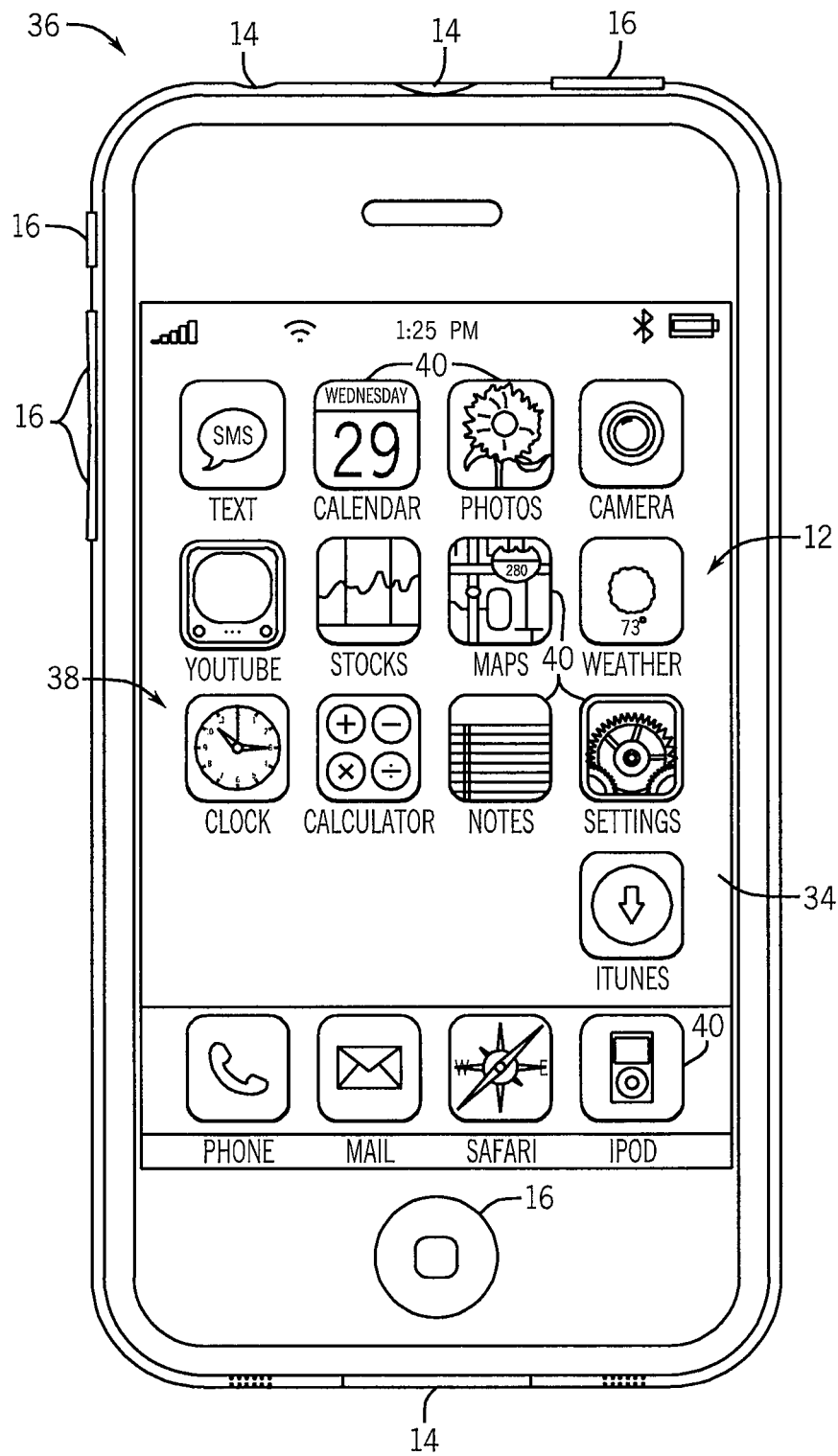
FIG. 3 is a perspective view of a handheld electronic device in accordance with aspects of the present disclosure.

Although an electronic device 10 is generally depicted in the context of a computer in FIG. 2, an electronic device 10 may also take the form of other types of electronic devices. In some embodiments, various electronic devices 10 may include mobile telephones, media players, personal data organizers, handheld game platforms, cameras, and combinations of such devices. For instance, as generally depicted in FIG. 3, the device 10 may be provided in the form of handheld electronic device 36 that includes various functionalities (such as the ability to take pictures, make telephone calls, access the Internet, communicate via email, record audio and video, listen to music, play games, and connect to wireless networks). By way of further example, handheld device 36 may be a model of an iPod® or iPhone® available from Apple Inc.

Handheld device 36 of the presently illustrated embodiment includes a display 12, which may be in the form of an LCD 34. The LCD 34 may display various images generated by the handheld device 36, such as a graphical user interface (GUI) 38 having one or more icons 40. The device 36 may also include various I/O ports 14 to facilitate interaction with other devices, and user input structures 16 to facilitate interaction with a user.

Figure 4:
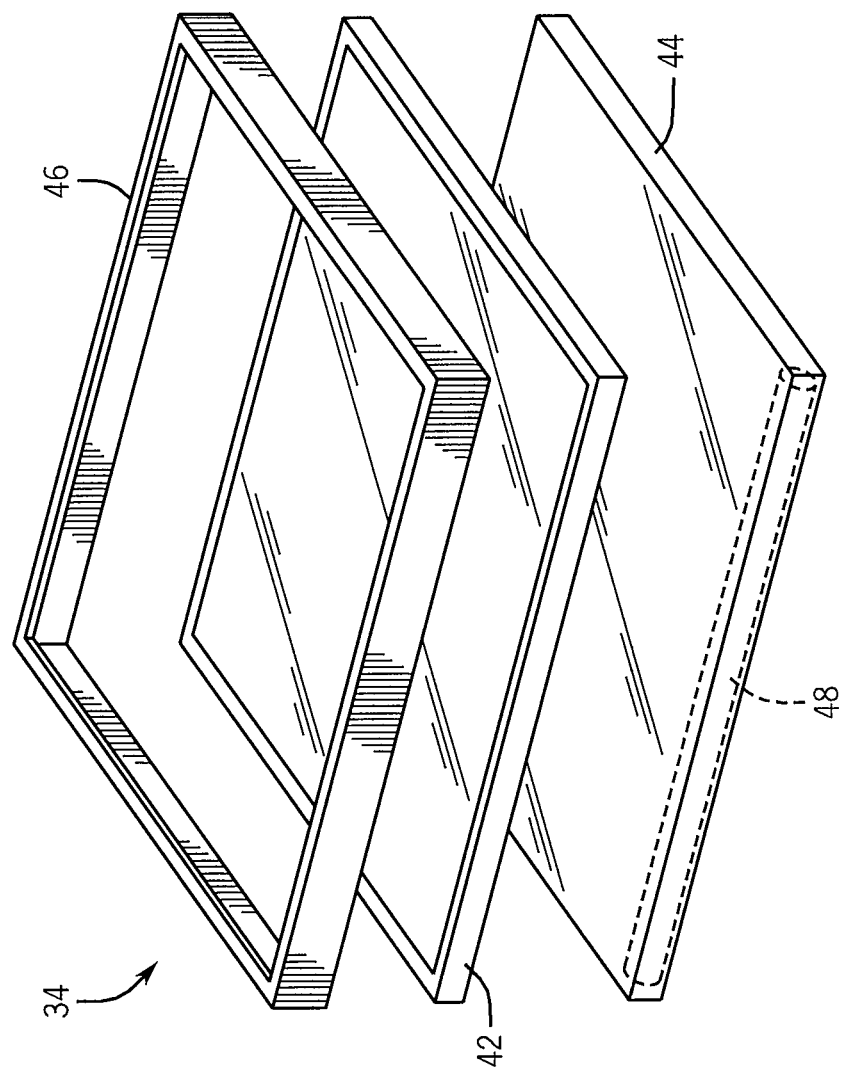
FIG. 4 is an exploded view of a liquid crystal display (LCD) in accordance with aspects of the present disclosure.

One example of an LCD display 34 is depicted in FIG. 4 in accordance with one embodiment. The depicted LCD display 34 includes an LCD panel 42 and a backlight unit 44, which may be assembled within a frame 46. As may be appreciated, the LCD panel 42 may include an array of pixels configured to selectively modulate the amount and color of light passing from the backlight unit 44 through the LCD panel 42. For example, the LCD panel 42 may include a liquid crystal layer, one or more thin film transistor (TFT) layers configured to control orientation of liquid crystals of the liquid crystal layer via an electric field, and polarizing films, which cooperate to enable the LCD panel 42 to control the amount of light emitted by each pixel. Additionally, the LCD panel 42 may include color filters that allow specific colors of light to be emitted from the pixels (e.g., red, green, and blue).

The backlight unit 44 includes one or more light sources 48. Light from the light source 48 is routed through portions of the backlight unit 44 (e.g., a light guide and optical films) and generally emitted toward the LCD panel 42. In various embodiments, light source 48 may include a cold-cathode fluorescent lamp (CCFL), one or more light emitting diodes (LEDs), or any other suitable source(s) of light. Further, although the LCD 34 is generally depicted as having an edge-lit backlight unit 44, it is noted that other arrangements may be used (e.g., direct backlighting) in full accordance with the present technique.

Figure 5:
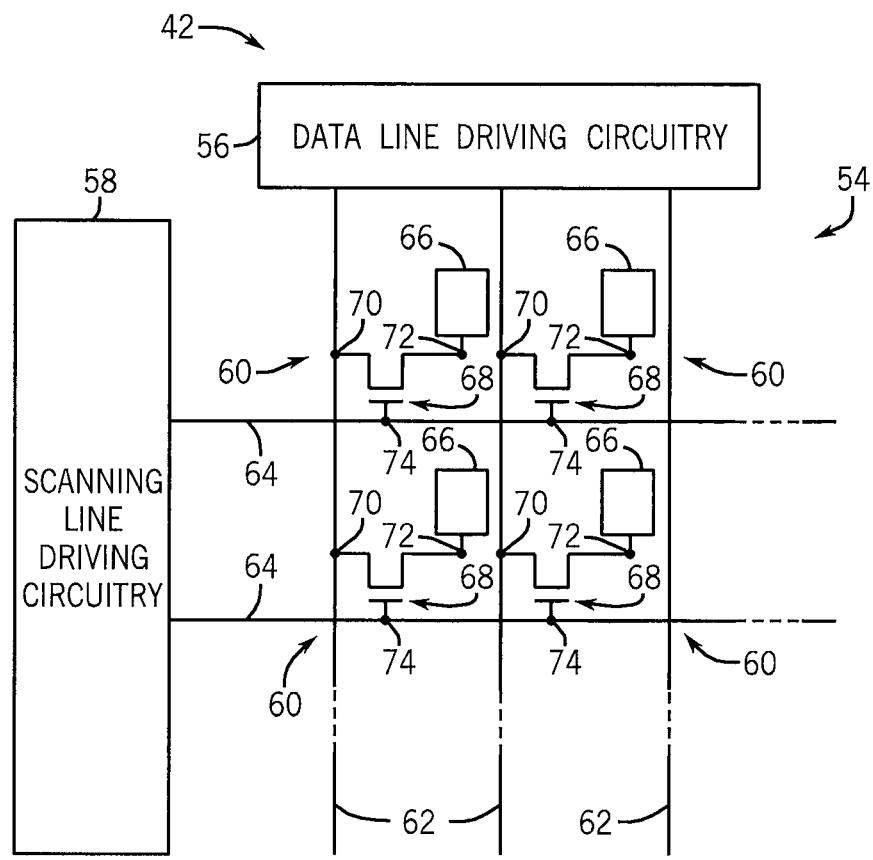
FIG. 5 graphically depicts circuitry that may be found in the LCD of FIG. 4 in accordance with aspects of the present disclosure.

Referring now to FIG. 5, an example of a circuit view of pixel-driving circuitry found in an LCD 34 is provided. For example, the circuitry depicted in FIG. 5 may be embodied on the LCD panel 42 described above with respect to FIG. 4. The pixel-driving circuitry includes an array or matrix 54 of unit pixels 60 that are driven by data (or source) line driving circuitry 56 and scanning (or gate) line driving circuitry 58. As depicted, the matrix 54 of unit pixels 60 forms an image display region of the LCD 34. In such a matrix, each unit pixel 60 may be defined by the intersection of data lines 62 and scanning lines 64, which may also be referred to as source lines 62 and gate lines 64. The data line driving circuitry 56 may include one or more driver integrated circuits (also referred to as column drivers) for driving the data lines 62. The scanning line driving circuitry 58 may also include one or more driver integrated circuits (also referred to as row drivers).

Each unit pixel 60 includes a pixel electrode 66 and thin film transistor (TFT) 68 for switching the pixel electrode 66. In the depicted embodiment, the source 70 of each TFT 68 is electrically connected to a data line 62 extending from respective data line driving circuitry 56, and the drain 72 is electrically connected to the pixel electrode 66. Similarly, in the depicted embodiment, the gate 74 of each TFT 68 is electrically connected to a scanning line 64 extending from respective scanning line driving circuitry 58.

In one embodiment, column drivers of the data line driving circuitry 56 send image signals to the pixels via the respective data lines 62. Such image signals may be applied by line-sequence, i.e., the data lines 62 may be sequentially activated during operation. The scanning lines 64 may apply scanning signals from the scanning line driving circuitry 58 to the gate 74 of each TFT 68. Such scanning signals may be applied by line-sequence with a predetermined timing or in a pulsed manner.

Each TFT 68 serves as a switching element which may be activated and deactivated (i.e., turned on and off) for a predetermined period based on the respective presence or absence of a scanning signal at its gate 74. When activated, a TFT 68 may store the image signals received via a respective data line 62 as a charge in the pixel electrode 66 with a predetermined timing.

The image signals stored at the pixel electrode 66 may be used to generate an electrical field between the respective pixel electrode 66 and a common electrode. Such an electrical field may align liquid crystals within a liquid crystal layer to modulate light transmission through the LCD panel 42. Unit pixels 60 may operate in conjunction with various color filters, such as red, green, and blue filters. In such embodiments, a "pixel" of the display may actually include multiple unit pixels, such as a red unit pixel, a green unit pixel, and a blue unit pixel, each of which may be modulated to increase or decrease the amount of light emitted to enable the display to render numerous colors via additive mixing of the colors.

In some embodiments, a storage capacitor may also be provided in parallel to the liquid crystal capacitor formed between the pixel electrode 66 and the common electrode to prevent leakage of the stored image signal at the pixel electrode 66. For example, such a storage capacitor may be provided between the drain 72 of the respective TFT 68 and a separate capacitor line.

Figure 6:
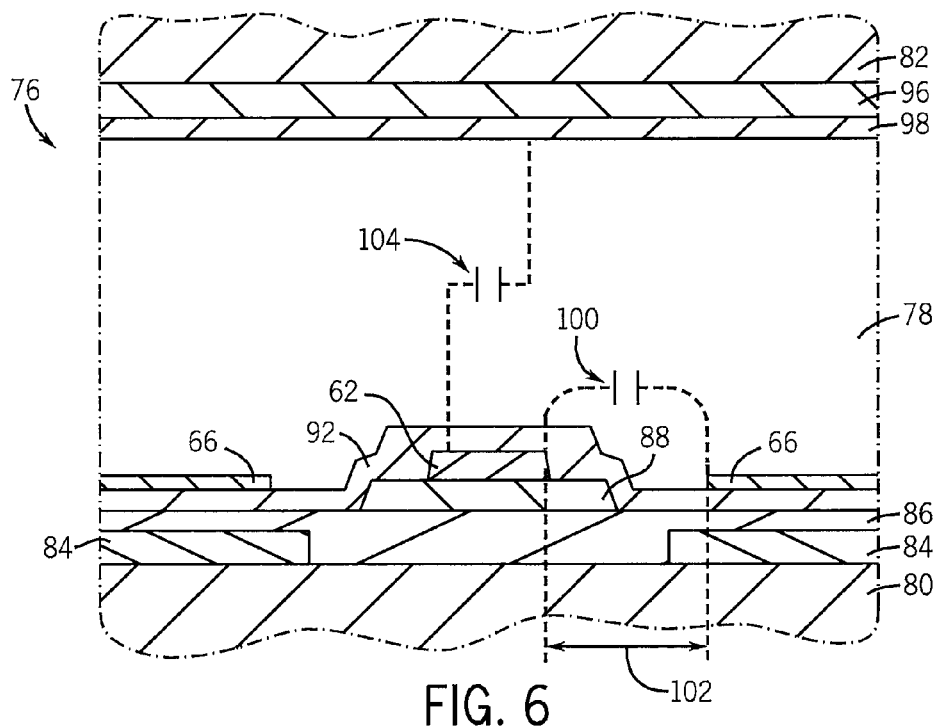
FIG. 6 is a partial sectional view of an LCD panel of the LCD of FIG. 4 depicting parasitic capacitances between various conductive components when the LCD panel is not illuminated via a backlight or other light source in accordance with aspects of the present disclosure.
Figure 7:
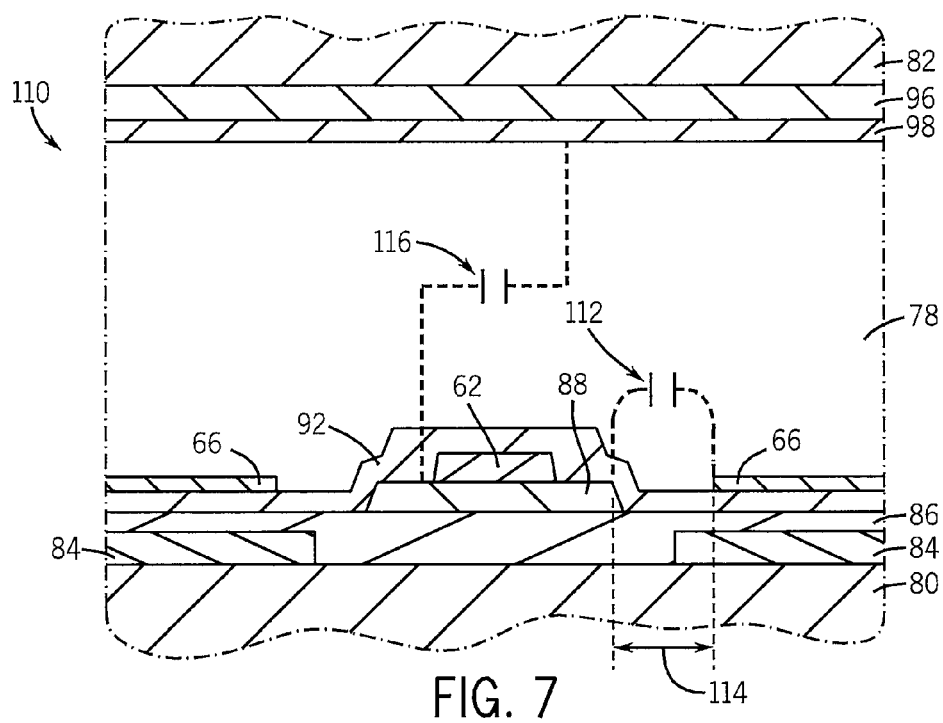
FIG. 7 is a partial sectional view of the LCD panel of FIG. 6 depicting increased parasitic capacitances between the various conductive components resulting from the increased conductivity of an active layer due to illumination of the LCD panel via the backlight or other light source in accordance with aspects of the present disclosure.

As noted above, the optical properties of a LCD panel, such as the LCD panel 42, may be impacted by exposure to light. By way of example, a partial cross-section of an LCD panel is depicted in FIGS. 6 and 7 in accordance with one embodiment. Particularly, FIGS. 6 and 7 generally illustrate differences in parasitic capacitances in such an LCD panel when the panel is not exposed to light (as generally represented by reference number 76) and when the panel is exposed to light (as generally represented by reference number 110).

In the presently illustrated embodiment, the LCD panel includes a layer of liquid crystals 78 disposed between substrates 80 and 82. The substrates 80 and 82 may include glass substrates, or may be formed of other transparent materials. In one embodiment, gate metal 84 for the TFTs 68 may be formed on the substrate 80. It is noted that the gate metal 84 may shield active channels of TFTs 68 (which may be formed of amorphous silicon) from light. A gate insulation layer 86 may be formed over the gate metal 84, and an active layer 88 may be provided on the gate insulation layer 86. The active layer 88 may be formed of any suitable material, such as amorphous silicon (a-Si). A conductive data line 62 may be formed over the active layer 88, and an insulation layer 92 may be disposed over the gate insulation layer 86, the active layer 88, and the data line 62.

Pixel electrodes 66 may be formed on the insulation layer 92, and may be formed of any suitable material, such as indium tin oxide (ITO) or indium zinc oxide (IZO). As noted above with reference to FIG. 5, data lines 62 may generally cooperate with TFTs 68 to charge the pixel electrodes 66. The substrate 82 may also include a black matrix layer 96 and a layer of conductive material, such as ITO or IZO, that serves as a common electrode 98 for at least some pixels of the LCD panel.

The pixel electrodes 66 and the common electrode 98 are charged to various levels to create electrical fields that manipulate orientation of the liquid crystals 78. Parasitic capacitances within the LCD panel, however, also impact the orientation of the liquid crystals 78. Those skilled in the art will appreciate that capacitance is directly proportional to the area of overlap of two conductive surfaces about an insulator, and is inversely proportional to the distance between the conductive surfaces. In the non-illuminated condition of FIG. 6, the parasitic capacitance 100 between the data line 62 and the pixel electrode 66 is inversely proportional to the distance 102 by which they are separated. Further, the parasitic capacitance 104 between the data line 62 and the common electrode 98 is generally proportional to the lateral surface area of the data line 62 depicted in FIG. 6.

In contrast, when the LCD panel is illuminated (FIG. 7), the conductivity and mobility of the active layer 88 increases due to the photoelectric effect. This results in both a larger parasitic capacitance 112 between the combination of the data line 62 and the active layer 88, and the pixel electrode 66 (as generally represented by the decreased distance 114), as well as a larger parasitic capacitance 116 between the data line 62-active layer 88 combination and the common electrode 98. These parasitic capacitances may impact the voltage differential between the pixel electrodes 66 and the common electrode 98, and thus may impact the transmittance of the associated pixels and introduce visual artifacts in images rendered by the LCD panel.

Figure 8:
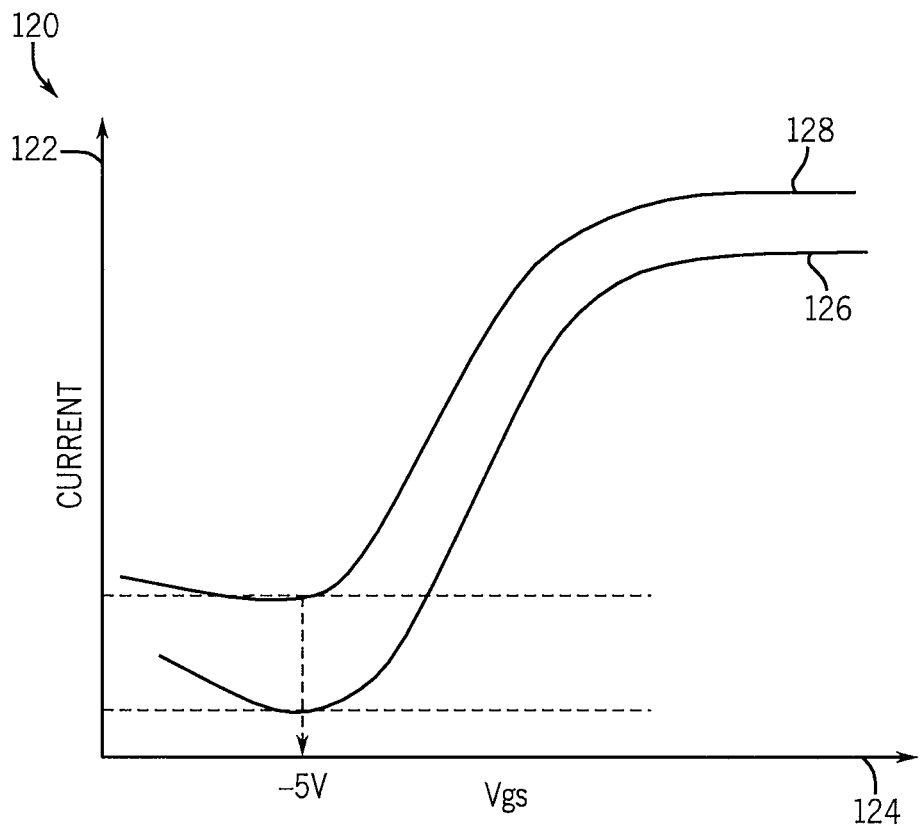
FIG. 8 is a graph illustrating the difference in leakage current characteristics of a TFT of the LCD panel of FIG. 4 due to photosensitivity of its active channel in accordance with aspects of the present disclosure.

FIG. 8 depicts a graph 120 illustrating the impact of the photosensitivity of an LCD panel on the leakage current of TFTs 68 of the panel. Particularly, the graph 120 illustrates the off-leakage current of the TFT 68 (i.e., the leakage current of the TFT 68 when in its "off" state) as a function of the voltage difference between its gate and its source (as provided along axes 122 and 124, respectively). Curve 126 generally represents the off-leakage current of the TFTs 68 of an LCD panel when not exposed to light, while curve 128 generally represents the off-leakage current for the LCD panel when the panel is exposed to light of a certain luminance. This increase of the off-leakage currents for the TFTs 68 of the LCD panel upon exposure to light may also change the voltage differential between the pixel electrodes 66 and the common electrode 98 and increase the number, magnitude, or both, of visual artifacts perceived by a user.

Figure 9:
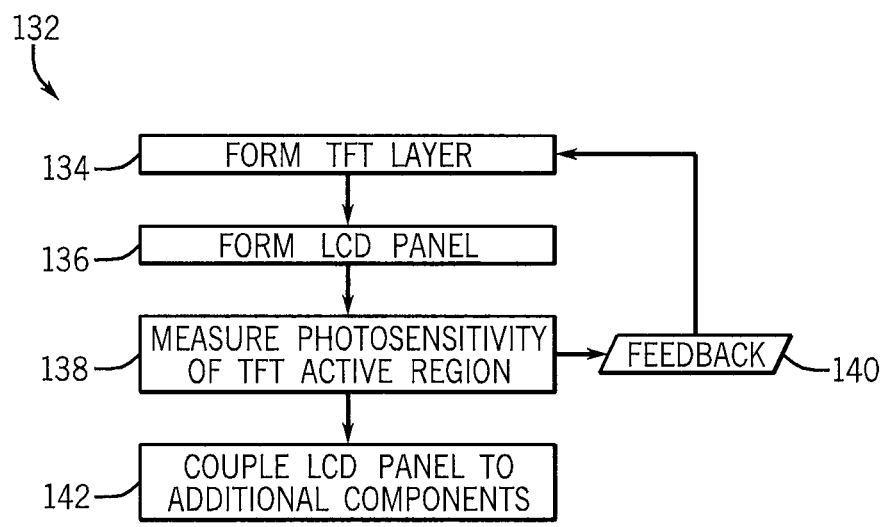
FIG. 9 is a flowchart generally depicting a method for manufacturing an LCD that implements a feedback loop based on measurement of the photosensitivity of an LCD panel in accordance with aspects of the present disclosure.

In one embodiment, LCDs may be manufactured in accordance with flowchart 132 as depicted in FIG. 9. At block 134, a TFT layer may be formed on a substrate, such as substrate 80 (FIG. 6), as generally described above. An LCD panel may then be formed at block 136. For example, forming the LCD panel may include coupling a TFT substrate, such as that formed at block 134, with an additional substrate (e.g., substrate 82) and filling the assembly with liquid crystals 78 between the two substrates. The photosensitivity of the formed panel, and particularly of the active regions of the TFT layer, may be measured at block 138. As discussed in greater detail below, feedback 140 may be provided and used to modify the manner in which the TFT layer is formed at block 134. For instance, excessive levels of photosensitivity may indicate that the active layer 88 or some other circuitry of the TFT layer is out of specification and should be adjusted. If the photosensitivity of the LCD panel is within expected tolerances, the LCD panel may be coupled to one or more additional components at block 142, such as a backlight unit and a housing. In other embodiments, the measurement at block 138 may be performed following the assembly with other components at block 142, such as for validation purposes.

Figure 10:
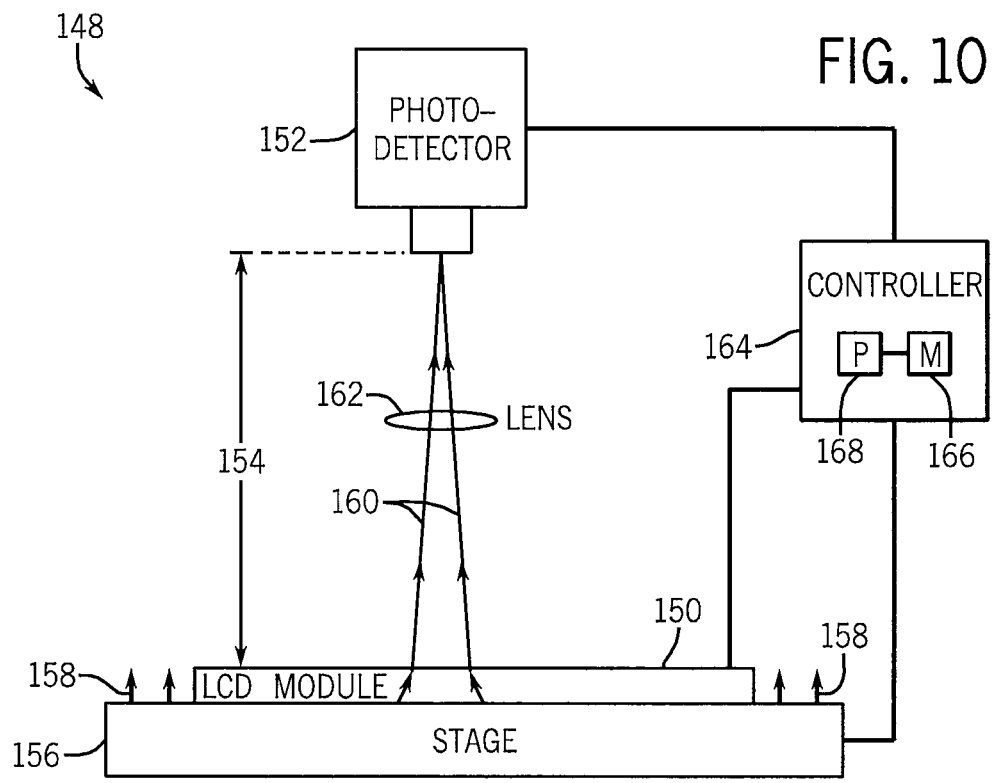
FIG. 10 depicts a testing apparatus to facilitate measurement of optical properties of an LCD module, such as an LCD panel, prior to assembly with a backlight or other components of an LCD in accordance with aspects of the present disclosure.

Testing of the photosensitivity or other optical properties of an LCD module may be carried out with a testing system 148, which is generally depicted in FIG. 10 in accordance with one embodiment. The system 148 may be installed at a mass production line for manufacturing displays, enabling testing of optical properties of the LCD module before assembly into an LCD and real-time or near real-time process quality control. In other instances, the system 148 may be used for validation purposes (e.g., to ensure that manufactured display modules have acceptable photosensitivity or other optical characteristics).

In this depicted embodiment, a LCD module 150 (e.g., the LCD panel 42) including a TFT layer and a liquid crystal layer, and a photodetector 152 may be spaced apart at a distance 154. In one embodiment, the distance 154 may be between about 400 mm and about 500 mm, though other distances 154 may instead be used. The photodetector 152 is generally positioned to receive light emitted through the LCD module 150 to facilitate measurement of transmittance differences of the LCD module 150 when exposed to lights of different intensities. The photodetector 152 may include any suitable device capable of measuring transmittance, such as the PR-650 manufactured by Photo Reasearch Inc. of Chatsworth, Calif.; the BM-5A manufactured by Topcon America Corp. of Paramus, N.J.; other spectroradiometers or charge-coupled devices (CCDs); or any of numerous alternatives. Also, testing of LCD modules 150 with the system 148 may be performed under dark room conditions to reduce potential error in the measurements.

In one embodiment, the LCD module 150 may be placed on a moveable stage 156 that facilitates placement of the LCD module 150 with respect to photodetector 152. Additionally, the stage 156 may include a variable light source that emits light 158 at selected luminances. Light 160 that has passed through the LCD module 150 may be received by the photodetector 152, which may measure the luminance of the received light 160. In one embodiment, a lens 162 may be provided to focus the light 160 on a sensor or receiving aperture of the photodetector 152.

A controller 164 may be used to control the components of the system 148 and to receive data from the photodetector 152. The controller 164 may be a digital controller, such as a computer, including a memory 166 and a processor 168. The memory 166 (e.g., an optical, magnetic, or solid-state storage medium) may include stored application instructions for performing various functionalities (including those described in the present disclosure), and these instructions may be executed by the processor 168. The system 148 may vary the intensity of light transmitted from stage 156 (or from some other light source) and determine transmittance differences of the LCD module 150 for the different light intensities to which it is exposed.

Figure 11:
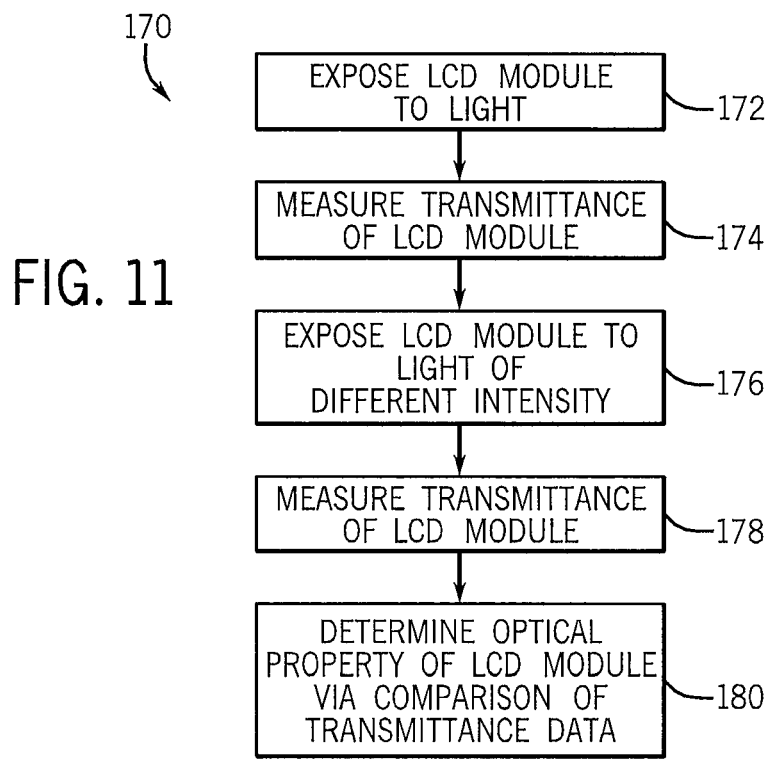
FIG. 11 is a flowchart representative of a process for determining an optical property of an LCD module in accordance with aspects of the present disclosure.

One example of a process for determining optical properties of the LCD module 150, such as photosensitivity, is depicted as a flowchart 170 in FIG. 11 in accordance with one embodiment. The LCD module 150 may be exposed to light at a first luminance level at block 172. Based on the amount of the light received at the photodetector 152, at block 174 the transmittance of the LCD module 150 for the light received at block 172 may be determined. The LCD module 150 may then be exposed to light at a different luminance level at block 176, and the transmittance of the LCD module 150 may be calculated at this level of luminance at block 178. The luminance levels of blocks 172 and 176 may be set to any desired level. In some embodiments, these luminance levels may be selected to be representative of the maximum and minimum luminance levels that would be provided by a backlight unit of an assembled display. For instance, one of the luminance levels may be set to between about 20 cd/m$^2$ to about 30 cd/m$^2$, and the other luminance level may be set to between about 400 cd/m$^2$ to about 500 cd/m$^2$. The various transmittance differences of the LCD module 150 resulting from the two different light intensities may be compared to determine an optical property (e.g., photosensitivity) of the LCD module 150 at block 180.

Figure 12:
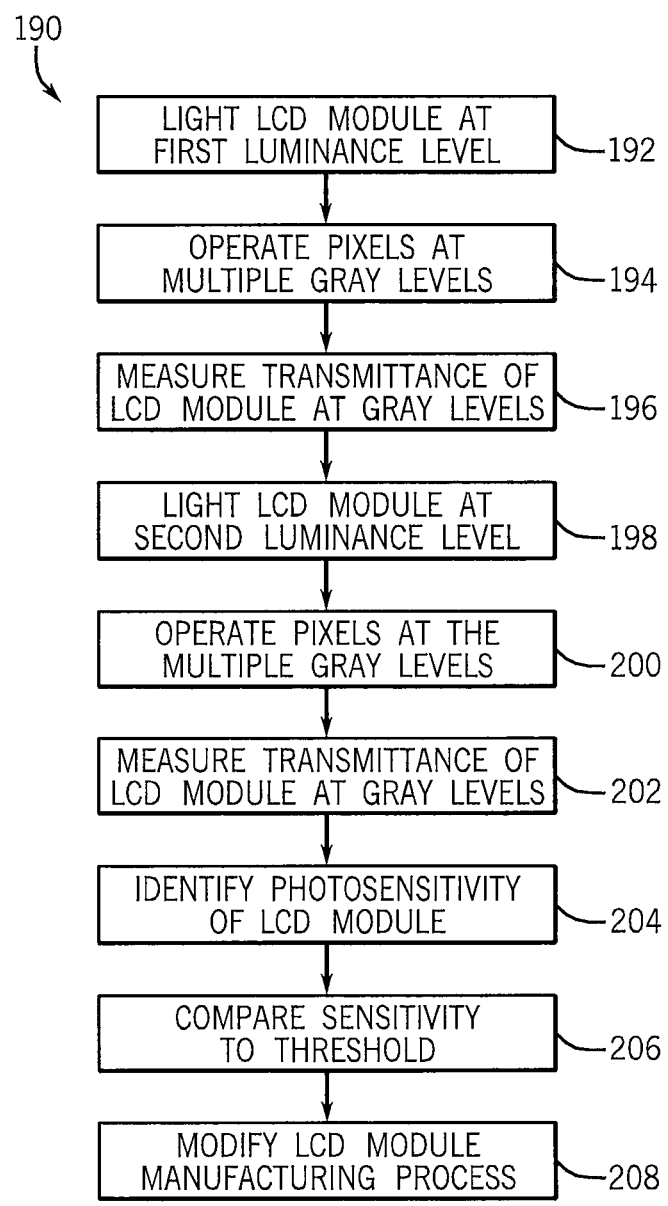
FIG. 12 is a flowchart depicting a method for testing an LCD module and modifying a manufacturing process based on the testing in accordance with aspects of the present disclosure.

In one embodiment, the LCD panel or module 150 may also be tested at various gray scale levels (i.e., pixel voltage levels) of its pixels in accordance with flowchart 190 of FIG. 12. First, the LCD module 150 may be illuminated at a first luminance level at block 192. As noted above, the light may be provided by the stage 156 or some other light source. While such light illuminates the LCD module 150, the pixels of the LCD module 150 may be operated at multiple gray scale levels at block 194 by applying different voltages to the pixels. For instance, the pixel driving circuitry of the LCD module 150 may be capable of applying sixty-four different voltage levels (or 256 different levels, or some other number of discrete levels) to the pixel electrodes, and the amount of light transmitted through the pixels depends on the voltage level applied to and stored in the pixels.

The transmittance characteristics of the LCD module 150 at the first luminance level may be determined for one or more gray levels at block 196. In some embodiments such measurements may be taken for each gray level that can be produced by the LCD module, but other embodiments may include taking transmittance measurements at a reduced number of gray levels. The number of gray levels for which measurements are taken, and the particular gray levels selected for measurement, may vary according to user preference.

At block 198, the LCD module may be illuminated at a second luminance level different than the first. One of the luminance levels may be comparable to lower levels of luminance capable of being provided by a backlight of an LCD in which the LCD module 150 is intended to be disposed, while the other luminance level may be comparable to higher levels of luminance capable of being provided by the backlight. As noted above, the first luminance level at block 192 may be about 20 cd/m$^2$ to about 30 cd/m$^2$ and the second luminance level may be about 400 cd/m$^2$ to about 500 cd/m$^2$, but other luminance levels may be used in full accordance with the present disclosure. For example, the higher luminance level may be more than two, three, five, ten, twelve, fifteen, twenty, thirty, or fifty times greater than the lower luminance level.

The pixels of the LCD module 150 may again be operated at the one or more gray levels and the transmittance of the LCD module for these gray levels may be measured, as generally indicated at blocks 200 and 202, respectively. The photosensitivity of the LCD module 150 may be identified at block 204, such as by comparing the gamma curves or data obtained at blocks 196 and 202 or, more generally, comparing differences in transmittance for the gray levels at the different light intensities. In some embodiments this sensitivity may be compared to a desired threshold at block 206. Further, if the photosensitivity of the LCD module 150 exceeds the desired threshold, a manufacturing process for forming the LCD module 150 may be modified at block 208. For example, if the photosensitivity of the LCD module 150 is higher than a desired level, the TFT layer may be redesigned, processing times for forming and patterning the structures of the TFT layer may be altered (e.g., to change the critical dimensions of the TFT layer), other additional remedial actions may be taken, or some combination of these actions may be performed.

Figure 13:
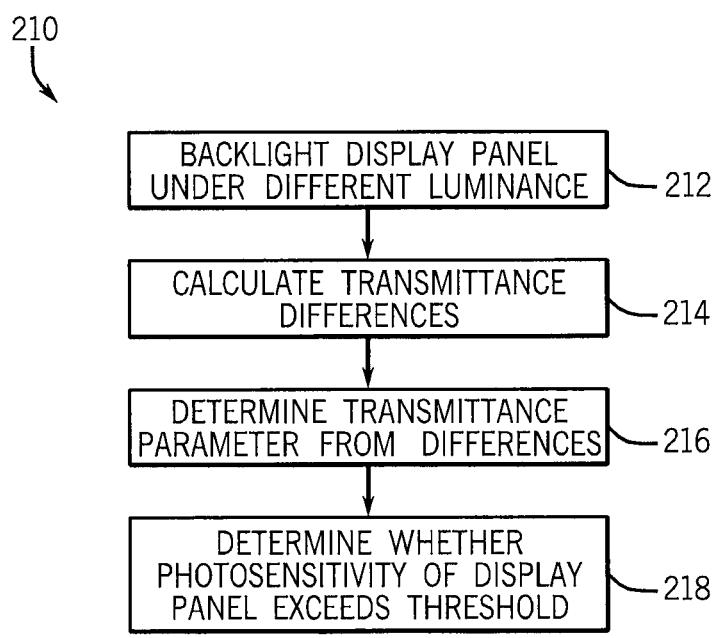
FIG. 13 is a flowchart depicting a method for testing an LCD module, in which at least one transmittance parameter of the LCD module is determined from transmittance differences of the LCD panel when exposed to light of different intensities and compared to a threshold in accordance with aspects of the present disclosure.

Additionally, further testing may be performed in accordance with flowchart 210 provided in FIG. 13 in accordance with one embodiment. Particularly, at block 212, a display panel (e.g., the LCD module 150) may be exposed to backlighting conditions of different luminances, as generally described above. Transmittance differences of the display panel resulting from the different luminances may be calculated at block 214. Further, these transmittance differences may be used to determine one or more transmittance parameters at block 216.

For example, in one embodiment, the transmittance differences at block 214 may be calculated for multiple gray levels of the display panel, and the maximum transmittance difference for any of the gray levels may be set as the transmittance parameter at block 216. In other embodiments, the transmittance differences calculated at block 214 may be used to determine a mean transmittance difference or a median transmittance difference, which also may be set as the transmittance parameter at block 216. Whether the transmittance parameters include a maximum transmittance difference, a mean transmittance difference, a median transmittance difference, or some other parameter derived from the transmittance differences calculated at block 214, the transmittance parameters may generally represent the photosensitivity of the display panel and at block 218 it may be determined whether the photosensitivity of the display panel exceeds one or more corresponding thresholds. In other words, at block 218, a maximum actual transmittance difference of the LCD panel may be compared to a maximum acceptable transmittance difference, a mean actual transmittance difference may be compared to a mean acceptable transmittance difference, and so forth.

A graph 230 generally depicting transmittance differences between three different panels (which may be calculated as described above) is generally provided in FIG. 14 in accordance with one embodiment. In graph 230, transmittance differences are depicted along the vertical axis 232 for multiple gray scale levels depicted along horizontal axis 234. In the present depiction, the first curve 236 generally represents transmittance differences between two luminance levels (e.g., high and low) at multiple gray scale levels of an LCD panel produced by a four-mask process. The second curve 238 may generally represent transmittance differences between the same two luminance levels, at the multiple gray scale levels, of an LCD panel also produced by a (different) four-mask process, but exhibiting less photosensitivity and "shimmering" than the LCD panel represented by curve 236. Further, curve 240 may generally represent transmittance differences between the two luminance levels and multiple gray scale levels of an LCD panel produced by a five-mask process.

As may be seen from the graph 230, the transmittance differences for the LCD panel represented by curve 236 (i.e., the more photosensitive four-mask panel) are significantly higher than the transmittance differences for the LCD panel represented by curve 238 (i.e., the less photosensitive four-mask panel). As a result, a user may perceive the panel represented by curve 236 to have greater visual artifacts than the panel represented by curve 238. In the present illustration, the curve 236 includes a maximum transmittance difference at data point 242, the curve 238 includes a smaller maximum transmittance difference at data point 244, and the curve 240 (representative of the five-mask produced panel) includes a still smaller maximum transmittance difference at data point 246.

If the maximum desired transmittance difference specified by a manufacturer (or a purchaser, or some other user) was 0.5, the manufacturer could determine that the panel represented by curve 238 meets this specification, while the panel represented by curve 236 does not. Further, if the maximum desired transmittance difference specified was 0.4, the manufacturer could determine that neither of the four-mask-produced panels meets this specification and could make changes to the manufacturing processes for one or both panels. As previously noted, the other transmittance difference characteristics (e.g., median or mean transmittance differences) may also or instead be compared to thresholds and to one another for testing purposes.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. Apparatus comprising:
a light source configured to illuminate a display panel;
a photodetector configured to receive light passing through the display panel from the light source; and
a controller configured to effect measuring, using the photodetector, of first and second gamma curves for the display panel at respective first and second luminance conditions, and to effect determination of transmittance differences between the first and second gamma curves of the display panel.

2. The apparatus defined in claim 1, wherein the first luminance condition is at least ten times greater than the second luminance condition.

3. The apparatus defined in claim 1, comprising a stage configured to position the display panel between the light source and the photodetector.

4. The apparatus defined in claim 3, wherein the stage includes the light source.

5. The apparatus defined in claim 1, comprising the display panel.

6. The apparatus defined in claim 1, wherein the photodetector includes a spectroradiometer.

7. Apparatus comprising:
a liquid crystal display module including liquid crystal disposed between first and second substrates;
a light source configured to illuminate the liquid crystal display;
a photodetector that receives light passing through the liquid crystal display from the light source; and
circuitry that directs, during at least a first period of time, the light source to illuminate the liquid crystal display with light at a first intensity, that measures a first amount of light received by the photodetector while the light source illuminates the liquid crystal display with light at the first intensity, that directs, during at least a second period of time, the light source to illuminate the liquid crystal display with light at a second intensity, that measures a second amount of light received by the photodetector while the light source illuminates the liquid crystal display with light at the second intensity, and that compares the measured first and second amounts of light to determine an optical property of the liquid crystal display.

8. The apparatus defined in claim 7, wherein the light source comprises a backlight unit coupled to an edge of the liquid crystal display module.

9. The apparatus defined in claim 7, wherein the circuitry measures the first and second amounts of light during operation of the liquid crystal display module at a plurality of gray levels.

10. The apparatus defined in claim 9, wherein the circuitry determines variations between transmittance of the liquid crystal display module when exposed to light at the first intensity and transmittance of the liquid crystal display module when exposed to light at the second intensity.

11. The apparatus defined in claim 10, wherein the circuitry determines the variations between transmittance of the liquid crystal display module when exposed to light at the first and second intensities for the plurality of gray levels.

12. The apparatus defined in claim 7 wherein the photodetector comprises a spectroradiometer.

13. The apparatus defined in claim 7 further comprising:
a moveable stage, wherein the liquid crystal display module is mounted on the moveable stage and wherein the moveable stage moves relative to the photodetector.

14. The apparatus defined in claim 7 further comprising:
at least one lens between the liquid crystal display module and the photodetector.

15. Apparatus comprising:
a display panel including a thin-film transistor layer having photosensitive active regions;
a backlight configured to illuminate the display panel;
a photodetector that receives light from the backlight and through the display panel; and
circuitry that directs the light source to illuminate the display panel under first and second different luminance conditions, that receives signals from the photodetector when the light source illuminates the display panel under the first luminance condition and when the light source illuminates the display panel under the second luminance condition, that calculates transmittance differences of the display panel between the first and second different luminance conditions, that determines a transmittance parameter from the calculated transmittance differences, and that determines whether photosensitivity of the display panel exceeds a maximum desired level by comparing the transmittance parameter to a predetermined transmittance threshold based on the maximum desired level.

16. The apparatus defined in claim 15 wherein the display panel comprises a liquid crystal display panel.

17. The apparatus defined in claim 15 wherein the photodetector comprises a spectroradiometer.

18. The apparatus defined in claim 15 further comprising:
a moveable stage, wherein the display panel is mounted on the stage.

19. The apparatus defined in claim 18 wherein the moveable stage moves relative to the photodetector
a moveable stage, wherein the liquid crystal display module is mounted on the moveable stage and wherein the moveable stage moves relative to the photodetector.

20. The apparatus defined in claim 15 further comprising:
at least one lens between the display panel and the photodetector.

* * * * *